Oct. 12, 1954 J. P. WOOD 2,691,412
JACK ACTUATED TIRE RELEASING DEVICE
Filed Dec. 22, 1950
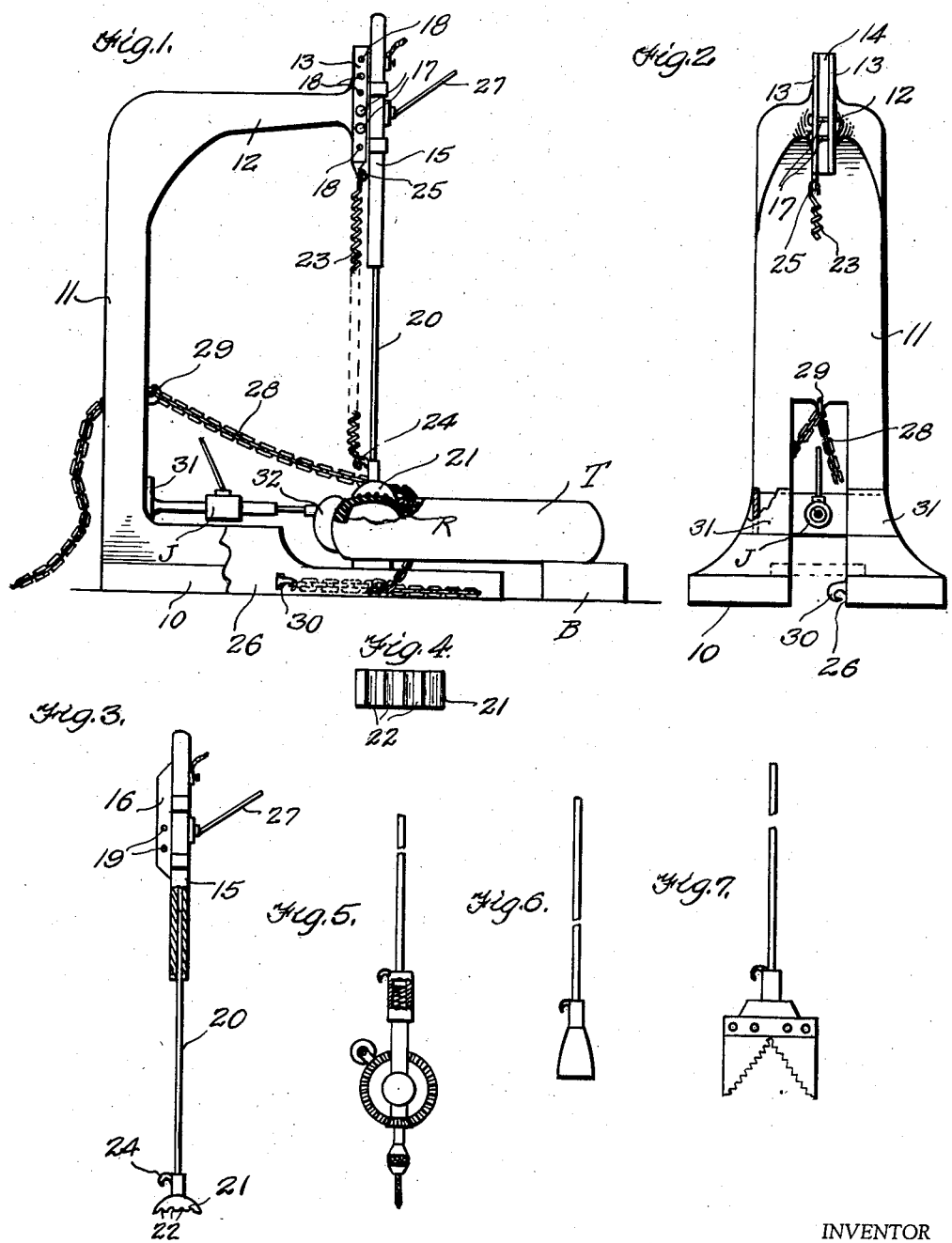
INVENTOR
JAMES P. WOOD
BY
HIS ATTORNEY Patented Oct. 12, 1954

2,691,412

UNITED STATES PATENT OFFICE 2,691,412

JACK ACTUATED TIRE RELEASING DEVICE

James P. Wood, Port Lavaca, Tex.

Application December 22, 1950, Serial No. 202,171

1 Claim. (Cl. 157—1.26)

This invention relates to a tire releasing device and has for one of its objects the production of a simple and efficient means for releasing or breaking a tire loose from its supporting rim.

A further object of this invention is the production of a simple and efficient tire holding and pressure means, whereby a tire and its rim may be conveniently supported so that the tire may be engaged by a pressure element, such as a jack for breaking the tire away from its supporting rim, and to thereby facilitate the removal of the tire from the rim.

Other objects and advantages of the present invention will appear throughout the following specification and claim.

In the drawing:

Figure 1 is a side elevational view of the tire releasing device, a portion of the base being broken away;

Figure 2 is a front elevational view of the device with the tire releasing jack removed, the tire abutment jack being shown in transverse section and the retaining spring and chain being broken away;

Figure 3 is a side elevational view of the tire releasing jack, a portion thereof being shown in section;

Figure 4 is a bottom plan view of the tire releasing shoe;

Figure 5 is a side elevational view of a hand drill attachment which may be used with the tire releasing jack;

Figure 6 is a side elevational view of a tool which may be used with the releasing jack for removing and replacing bearing and races from wheels; and Figure 7 is a side elevational view of a tool in the nature of a grip vise which may be used with the releasing jack.

By referring to the drawing in detail, it will be seen that 10 designates the base of the jack frame which is provided with an upstanding standard 11. The standard 11 is provided with a tire releasing jack supporting arm 12 which overhangs the base 10 in vertical spaced relation to the base 10, as is shown in Figure 1. The arm 12 is provided at its outer end with a pair of spaced vertical plates 13 defining a vertical channel 14.

A vertically arranged tire releasing jack 15 carries a rib portion 16 which fits into the channel 14 and is held therein in a vertically adjusted position by removable pins 17. These pins 17 selectively fit through the vertically aligned apertures 18 of the spaced plates 13 and through the apertures 19 of the rib portion 16 to anchor the tire releasing jack in a vertically adjusted position between the plates 13. The tire releasing jack may be hydraulically operated or hand operated without departing from the spirit of the invention. In other words any suitable conventional means may be used to force the plunger rod or pressure rod 20 downwardly toward the tire T, shown in Figure 1.

A tire releasing shoe 21 is carried by the lower end of the plunger rod or pressure rod 20 and the under face is shaped to conform to the shape of the tire. The under face of the shoe 21 is provided with a plurality of transversely extending ribs 22 to provide a roughened tire gripping surface. The pressure rod 20 is slidable within the tire releasing the jack 15, for the purpose of replacement by one of the tools shown in Figures 5 to 7 inclusive. A retracting coil spring 23 is adapted to lift the rod 20 upwardly when pressure on the jack is released and thereby release the shoe 21 out of engagement with the side of the tire T. The jack 15 may be of any suitable type, either hydraulic or mechanically operated. The pressure of the shoe 21 upon the tire T may generally be sufficiently released by removing the hand from the lever 27 to permit the spring 23 to release the grip of the shoe 21 from the tire. If a pawl and rack type of jack is used, the pawl or ratchet may be released in the conventional manner. The coil spring 23 is releasably connected at its lower end to the hook 24 of the shoe 21 and is likewise releasably connected at its upper end to the hook 25 which is carried by one of the plates 13.

The tire T and the rim R are of the conventional type. The base 10 is bifurcated or slotted, as at 26, and may support the tire T in the manner shown in Figure 1, or the tire may be supported in any suitable manner where the side of the tire T may be properly engaged by the shoe 21 to release or break the tire away from the rim R. In operation however, it is preferable to proceed as follows:

The wheel is placed horizontally upon the base with the outer end of the tire T resting on the block B which is preferably two inches thick of a conventional type, spaced from the base, as shown in Figure 1, so that the shoe or foot-piece 21 engages the side of the tire close to the rim R, as shown in Figure 1. With a few strokes of the operating lever 27 of the tire releasing jack the rod 20 is extended so that the tire T is disengaged or broken away from the rim R, at one side thereof. The wheel is then turned over or reversed. A chain 28 which is anchored at a suitable location upon the hook 29 is drawn through the wheel and the chain 28 is then anchored near its opposite end to the hook 30, which hook 30 is carried by the base 10 within the slotted portion 26. This will hold the tire and wheel in place upon the base as the operation is continued. The shoe 21 is then brought into engagement with the side of the tire which has not been released from the rim, and contacting the tire adjacent the rim. Pressure is then applied to force the rod 20 downwardly and to thereby force the shoe 21 against the tire T for breaking the remaining side of the tire away from the rim R.

A horizontally mounted jack J of the conventional type is detachably secured to the base of the standard 11 by fitting engagement with the anchoring plates 31. This jack J is provided with a tire engaging shoe 32 which exerts pressure against the tire T toward the center of the rim R. A hand tire tool is then used to remove the tire T from the rim R. The tire may be replaced by putting the tire horizontally on the block and the base. The tire is pressed toward the center of the rim by jack J and the tire is forced into engagement with the rim R by means of a hand tire tool of the conventional type.

In Figures 5, 6 and 7 there are shown different types of tools, such as a hand drill, a bearing releasing and replacing tool, and a grip vise, which are provided with suitable rods for fitting into the jack 15 in place of the rod 20 shown. Any type of tool may be actuated by the jack 15 without departing from the spirit of the invention. In this way the device is adapted for use in many ways and for work which is difficult to handle otherwise.

It is very difficult to release tires from rims, and particularly to release a tractor tire from the rim, since the tire cannot be easily broken from the rim with the conventional sledge hammer and pry bar. The apparatus above defined, however, enables an operator to quickly and easily break a tire loose from the rim without the danger of injuring the tire. Furthermore by providing a structure to which various types of tools may be releasably carried by the jack 15, the use of the device for various purposes has been greatly extended.

It should be noted that certain changes in detail construction may be made without departing from the spirit of the invention, so long as these changes fall within the scope of the appended claim.

Having described the invention, what is claimed as new is:

A tire releasing device comprising a frame including a longitudinally extending base, an upstanding standard carried at one end of said base, a vertically adjustable pressure jack suspended above said standard, the base being adapted to support a tire and wheel rim in a horizontal position, a pressure shoe carried by said jack for engaging the side of a tire adjacent the beading of a tire and adjacent the wheel rim, said base having a slotted portion, flexible means detachably secured at one of its ends to said base and adapted to pass transversely under and around a wheel rim and detachably secured at its other end to said standard above said slotted portion for holding the rim in a set position and constituting a rim anchoring means, an individually adjustable horizontal abutment carried by said base, said horizontal abutment having a tire tread engaging means extending at right-angles to said pressure shoe and in opposed relation to said rim anchoring means for firmly holding the tread of the tire in a set position and to prevent the tread of the tire from expanding outwardly away from the rim as said pressure shoe is forced against the side of the tire by the pressure jack to thereby facilitate the breaking of the beading of a tire from the rim in a manner whereby the pressure of the pressure shoe will be exerted upon the side of the tire adjacent the beading thereof.

References Cited in the file of this patent

UNITED STATES PATENTS

| Number | Name | Date |
| --- | --- | --- |
| 1,137,555 | Turnbull | Apr. 27, 1915 |
| 1,646,511 | Weaver et al. | Oct. 25, 1927 |
| 1,936,817 | Allen | Nov. 28, 1933 |
| 1,966,766 | Raby et al. | July 17, 1934 |
| 2,506,007 | Winstead | May 2, 1950 |
| 2,523,448 | Reitz | Sept. 28, 1950 |
| 2,528,362 | Hauta | Oct. 31, 1950 |
| 2,582,869 | Honeycutt | Jan. 15, 1952 |
| 2,602,494 | Larson | July 8, 1952 |